Aug. 28, 1962   W. L. MEHL ETAL   3,051,155
ENGINE STARTER APPARATUS FOR LAWN MOWERS
Filed Oct. 13, 1960   4 Sheets-Sheet 1
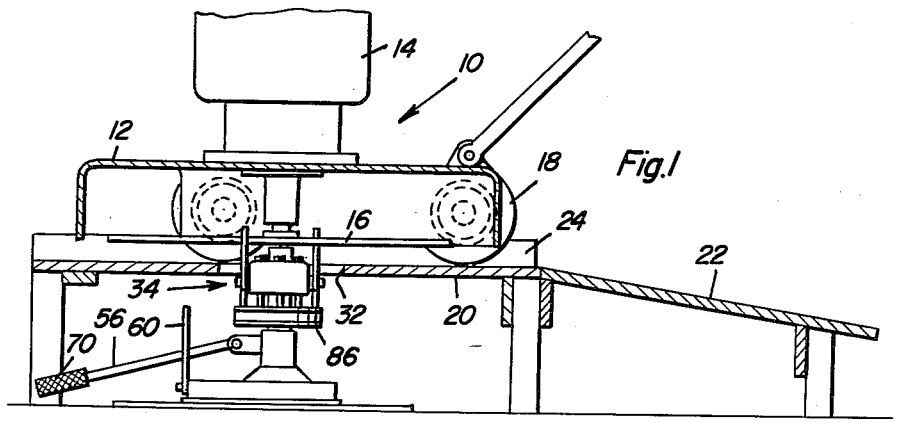
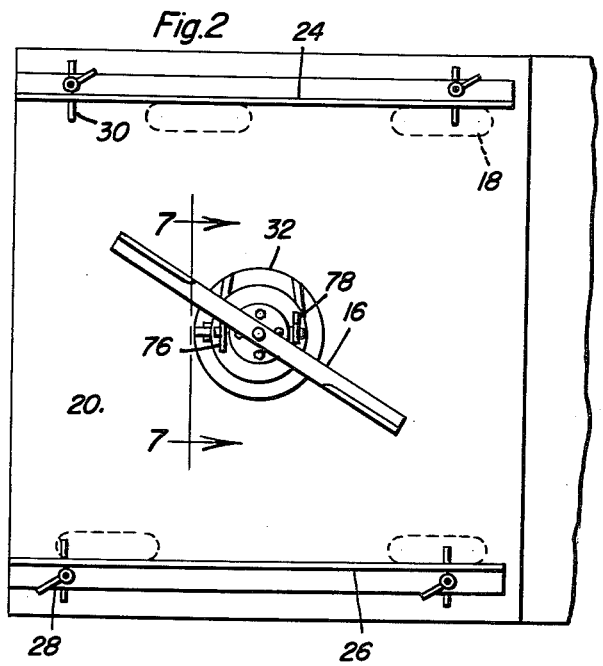
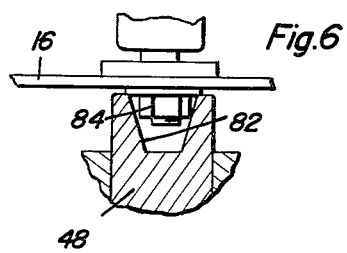
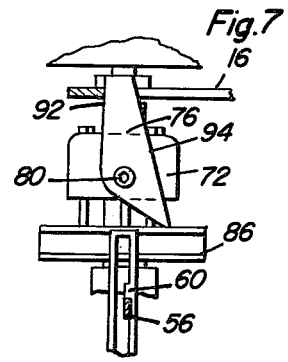
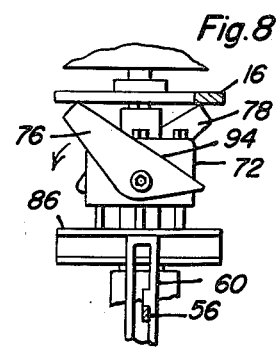
Walter L. Mehl
William A. Reid
INVENTORS
BY *Clarence A. O'Brien*
*and Harvey B. Jacobson*
Attorneys Aug. 28, 1962 W. L. MEHL ETAL 3,051,155
ENGINE STARTER APPARATUS FOR LAWN MOWERS
Filed Oct. 13, 1960 4 Sheets-Sheet 2
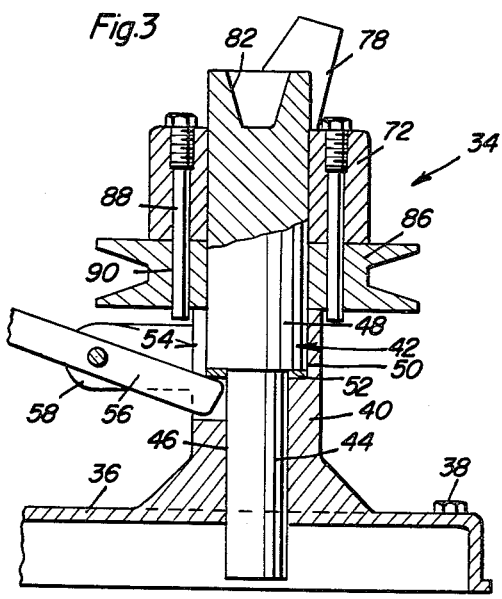
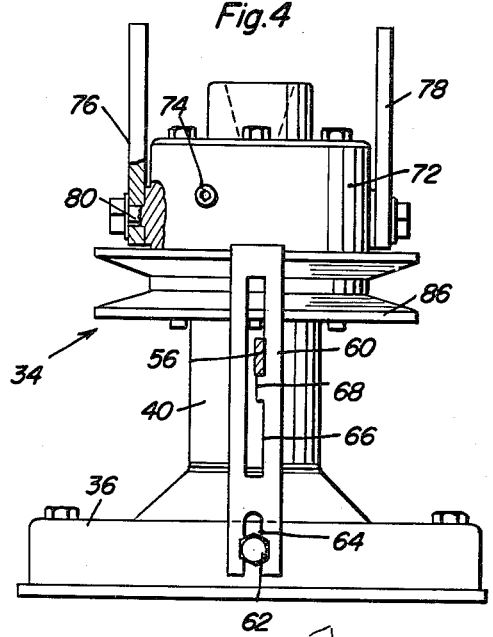
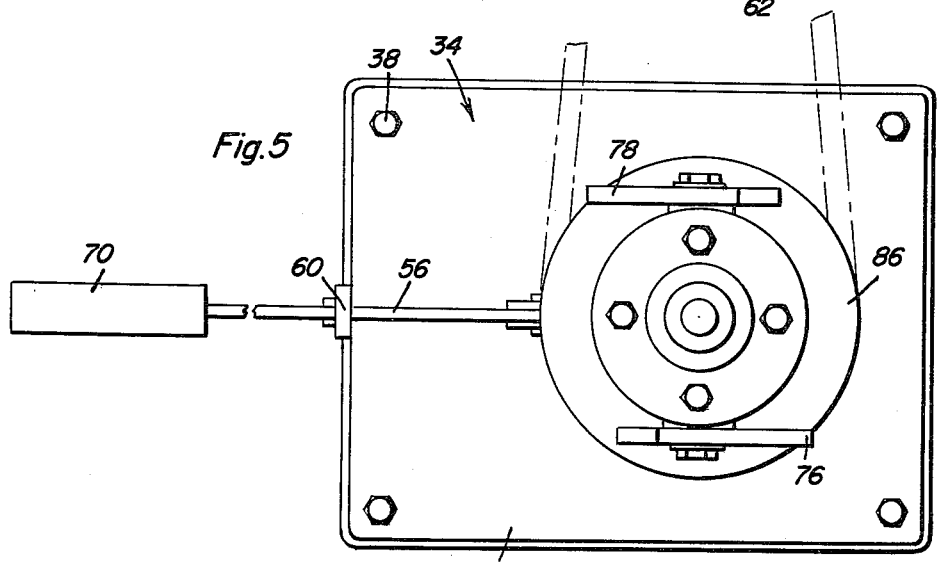
Walter L. Mehl
William A. Reid
INVENTORS
BY Clarence A. O'Brien
and Harvey B. Jackson
Attorneys Aug. 28, 1962 W. L. MEHL ETAL 3,051,155
ENGINE STARTER APPARATUS FOR LAWN MOWERS
Filed Oct. 13, 1960 4 Sheets-Sheet 3

Walter L. Mehl
William A. Reid
INVENTORS

BY Clarence A. O'Brien
and Harvey B. Jacobson
Attorneys

Aug. 28, 1962 W. L. MEHL ETAL 3,051,155
ENGINE STARTER APPARATUS FOR LAWN MOWERS
Filed Oct. 13, 1960 4 Sheets-Sheet 4

Walter L. Mehl
William A. Reid
INVENTORS

BY *Clarence A. O'Brien*
*and Harvey B. Jacobson*
Attorneys

United States Patent Office 3,051,155
Patented Aug. 28, 1962

3,051,155
ENGINE STARTER APPARATUS FOR LAWN MOWERS
Walter L. Mehl, Mardela Springs, Md. (P.O. Box 568, Salisbury, Md.), and William A. Reid, P.O. Box 568, Salisbury, Md.
Filed Oct. 13, 1960, Ser. No. 62,449
16 Claims. (Cl. 123—179)

This invention relates to apparatus and a method for starting of engines on a rotary type of lawn mower in a unique and novel manner.

The rotary type of lawn mower widely used today by individual homeowners has created problems in engine operation and repair peculiar to rotary lawn mower engines. Of particular concern in the operation of the rotary mower engine encountered by the homeowner is the starting of the engine. A common experience therefore involves one's inability to start the mower engine because of lack of maintenance and failure to replace or clean parts so as to maintain a smoothly operating engine. This invention therefore is especially useful in providing a quick and effective method and apparatus for starting all types of rotary lawn mowers whether said mowers are started by automatic rewind mechanisms or otherwise manually started. The starter mechanism of this invention is accordingly a useful tool for mower repairmen or anyone desirous of having equipment available for immediately starting exceptionally hard to start engines on the rotary type of lawn mower.

It is therefore a primary object of this invention to provide apparatus and a method for starting of the engine of a rotary type of lawn mower which is otherwise especially difficult to start by any other means heretofore utilized for such purpose.

Another object of this invention is to provide apparatus adaptable for lawn mowers of different sizes and shapes to rapidly start the engine thereof or maintain the blades and engine rotating as an aid in diagnosing engine troubles.

The apparatus and equipment of this invention therefore involves the positioning of the rotary type lawn mower above a starter mechanism and either raising the starter mechanism or lowering the mower for engagement of the blades of the mower with the starter mechanism to start the engine. The starter mechanism is accordingly driven by a power source and in response to rotation of the mower blade by the mower engine will disengage therefrom. Accordingly, a lawn mower exhibiting starting difficulties may be immediately moved up a ramp to a platform above the starter mechanism which mechanism is either subsequently raised upwardly or the platform lowered for engagement of the mechanism below with the mower blades upon rotation of the starter mechanism, the mower blade being rotated to start the mower engine or maintain it rotating.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a partial sectional view illustrating a rotary lawn mower positioned for starting thereof by one form of apparatus of this invention.

FIGURE 2 is a partial plan view of the arrangement illustrated in FIGURE 1.

FIGURE 3 is a partial sectional view of the starter mechanism associated with the apparatus of FIGURE 1.

FIGURE 4 is a partial sectional view of the starter mechanism from another side thereof.

FIGURE 5 is a top plan view of the starter mechanism.

FIGURE 6 is a partial sectional view of the centering socket of the starter mechanism and the mower blade cooperating therewith.

FIGURE 7 is a partial sectional view taken through a plane indicated by section line 7—7 of FIGURE 2, illustrating the starter mechanism driving the mower blades.

FIGURE 8 is a partial sectional view similar to FIGURE 7 but illustrating the overrun condition of the starter mechanism after the mower blade has started up.

Figure 9:
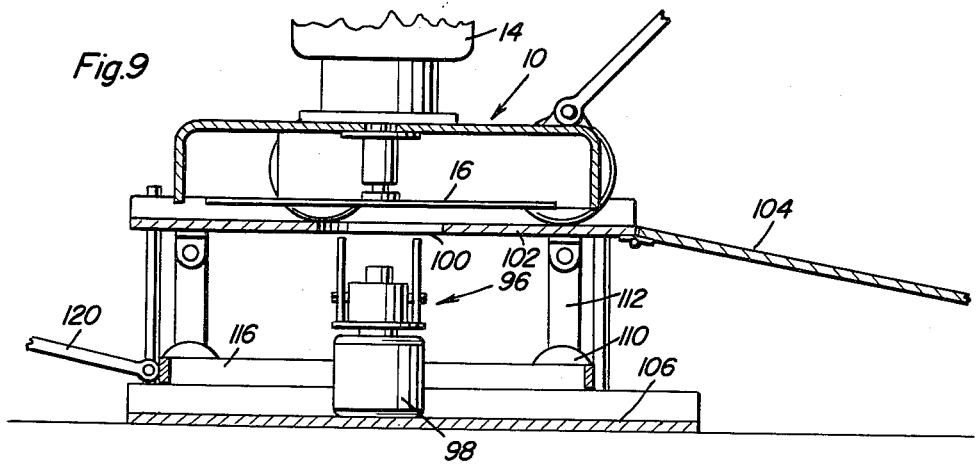
FIGURE 9 is a partial sectional view of a second form of starter mechanism and apparatus illustrated in disengaged condition.

Referring now to the drawings in detail, FIGURE 1 illustrates a rotary type of lawn mower of conventional design and generally indicated by reference numeral 10. It will be observed therefore that the mower 10 includes a rotor casing 12 above which the mower engine 14 is mounted. Accordingly, the engine drives an output shaft to which the mower blade 16 is connected, which blade is disposed beneath the mower casing 12 so as to cut the grass over which the mower 10 is moved by means of the wheels 18. As will be seen in FIGURES 1 and 2, the mower 10 is positioned on a platform 20 to which it is moved by means of the ramp 22. A pair of adjustable track members 24 and 26 are accordingly provided on the platform 20 for accommodating different wheel spacings therebetween for different size and shapes of lawn mowers, the track members 24 and 26 are accordingly adjustably positioned on the platform 20 by a plurality of adjustable lock members 28 cooperating with slots 30 provided in the platform 20 for such purpose. It will also be observed that a centrally located opening 32 is provided in the center of the platform 20 with which the engine shaft is aligned so that the starter mechanism generally indicated by reference numeral 34 may extend upwardly through the opening 32 for engagement with the mower blade 16.

Referring now to FIGURES 3, 4 and 5 it will be observed that the starter mechanism 34 includes a base 36 which may be bolted to the floor by anchoring bolts 38 and accordingly rigidly held in position in alignment with the opening 32 in the platform 20. Connected to the base 36 and extending upwardly therefrom is a fixed standard 40 within which a shaft 42 is slidably disposed.

It will be observed that in order to provide guiding means for the shaft, the shaft 42 includes a lower section 44 slidably seated within bore 46 of the standard 40 while the upper section 48 is slidably received within an enlarged bore 50 of the standard 40 as more clearly seen in FIGURE 3. A thrust washer 52 is accordingly provided at the bottom of the enlarged bore 50 for engagement with the shouldered portion of the shaft 42 between the upper and lower sections thereof to accordingly adjustably position the shaft 42 at the proper height.

Referring to FIGURES 3 and 4, it will now be observed that an opening 54 is provided in the standard 40 through which the inner end of a lift lever 56 extends into engagement with the thrust washer 52 on the shoulder portion of the shaft 42. The lift lever 56 is accordingly pivotally mounted by means of a projecting lug 58 extending laterally away from the standard 40. The lift lever 56 therefore cooperates with a detent member 60 adjustably connected by means of bolt 62 and slot 64 to one side of the base 36. The detent member 60 accordingly includes a slot 66 having a centrally disposed projection 68 therein so as to position the lever 56 either above or below the projection 68 for holding the lift lever 56 in one of two positions, as more clearly seen in FIGURE 4. As seen in FIGURES 1, and 5, a handle bar 70 is provided at the outer end of the lift lever 56 in order to readily manipulate the lever.

Referring to FIGURES 3 and 4 once again, it will be observed that a clutch mounting block 72 is connected adjacent the upper end of the upper section 48 of the shaft 42 in any suitable manner as for example by a setscrew 74 as seen in FIGURE 4. The clutch block 72 therefore pivotally mounts on either side thereof a pair of ratchet arms 76 and 78. The ratchet arms 76 and 78 are accordingly pivotally mounted on pivot extensions 80 at opposite sides of the mounting block 72 and extend upwardly beyond the upper end of the upper shaft section 48 for engagement with the rotor blade 16 when the starter mechanism 34 is raised up into engagement by means of a lift lever 56. When the lift lever 56 so raises the starter mechanism 34 by vertically displacing the shaft 42 upwardly, the starter mechanism 34 will automatically align the engine shaft thereabove by means of a socket 82 which engages the blade mounting bolt head 84, by means of which the mower blade 16 is connected to the engine shaft as more clearly seen in FIGURE 6.

It will therefore be apparent that when the starter mechanism 34 is raised upwardly by the lever 56 engaging the lower portion of the shaft section 48 the mechanism 34 may be retained in its engaged position by means of the projection 68 on the detent member 60 disposed above the lever 56. Accordingly, a power mechanism for rotating the starter mechanism 34 is mounted on the fixed standard 40 in axially fixed position and drivingly connected to the clutch block 72 for rotation thereof together with the ratchet arms in order to impart drive to the mower blade 16. In the example illustrated in FIGURES 1 through 8, a pulley wheel 86 is provided for such purpose. Accordingly, the pulley wheel 86 may be gear or belt connected as seen in FIGURE 5 to any suitable source of power such as an electric motor. It will be appreciated however that other arrangements may be provided such as the mounting of the electric motor directly on the fixed standard 40 for drive connection to the mounting block 72. Accordingly, the mounting block 72 has readily connected thereto a pair of pins 88 slidably received within apertures 90 in the pulley wheel 86 so that the pulley wheel 86 may drive the mounting block 72 and yet permit slidable displacement of the block 72 relative to the pulley wheel 86.

Referring now to FIGURES 7 and 8, it will be observed that the sliding block 72 is axially displaced from the pulley wheel 86 by means of the lift lever 56 so as to bring the ratchet arms 76 and 78 into engagement with the rotor blade 16 as shown in FIGURE 7. The pulley wheel 86 accordingly drives the clutch block 72 in such a direction that the driving edge 92 of the ratchet arm engages the sides of the motor blade 16 to accordingly angularly displace the ratchet arm 76 for example in a clockwise direction as viewed in FIGURE 7 into engagement with the top surface of the pulley 86 limiting further pivotal displacement of the ratchet arm 76. Accordingly, the ratchet arm will be effective to drive rotor blade 16 in one direction only. Referring now to FIGURE 8, it will be observed that when the engine has started up it will drive the rotor blades 16 ahead of the ratchet arm 76 and 78 and therefore engage the trailing edge 94 of the ratchet arm 76 for example to thereby cause the ratchet arm to pivot in a counterclockwise direction out of engagement with the rotor blades 16 so that the rotor blade 16 may overrun the starter mechanism. Although one specific type of one-way clutch mechanism involving the ratchet arms 76 and 78 has been disclosed in the above example, other types of equivalent clutch mechanism may be employed operating pursuant to the above stated principles and concepts of the invention.

Figure 10:
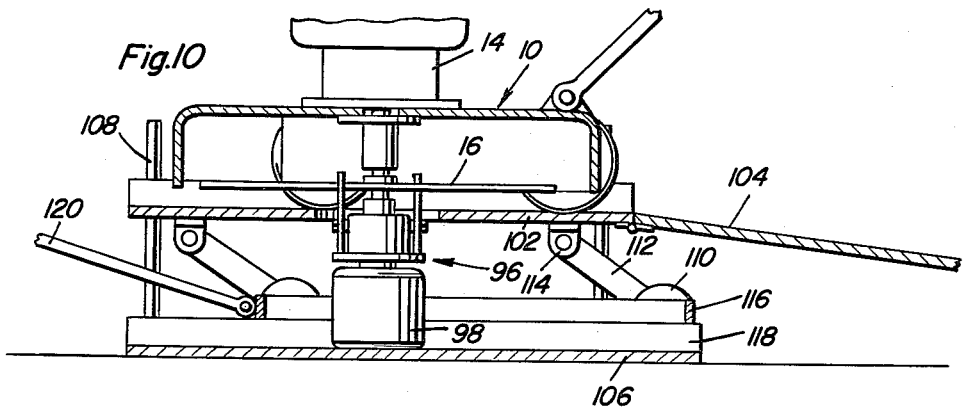
FIGURE 10 is a sectional view similar to FIGURE 9 but showing the apparatus in engaged condition.
Figure 11:
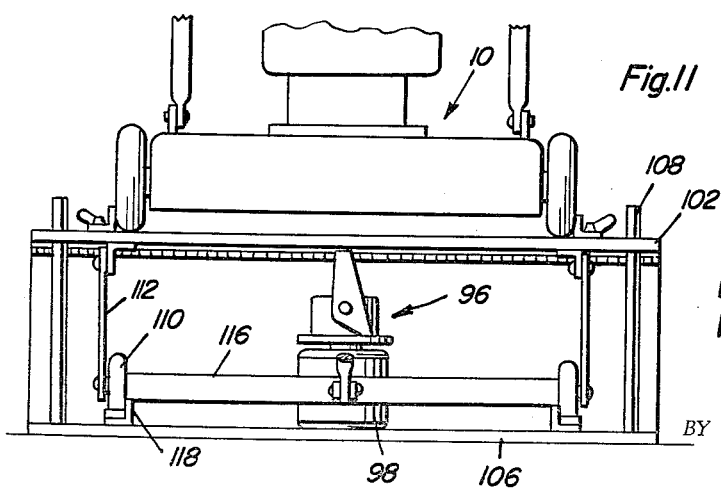
FIGURE 11 is a rear elevation view of the apparatus illustrated in FIGURE 9.

FIGURES 9 through 11 and 14 illustrate a second form of apparatus for starting lawn mowers in accordance with this invention. The starter mechanism generally indicated by reference numeral 96 in FIGURES 9 through 11, is similar to the starter mechanism 34 as described with respect to FIGURES 1 through 8, except that the starter mechanism 96 is axially fixed to the motor shaft of the motor 98 above which it is mounted in alignment with opening 100 in the platform 102 on which the lawnmower 10 is positioned for starting purposes. It will therefore be observed that the platform 102 is hingedly connected to the ramp 104 in order to enable one to lower or raise the platform 102 with respect to the fixed base member 106 upon which the motor 98 is anchored. A plurality of corner guide posts 108 are therefore provided to serve as guide means for guiding movement of the platform 102 relative to the fixed base 106. The posts 108 are therefore anchored at the bottom thereof to the base 106 and are slidably received by the platform member 102 adjacent the corners thereof. The platform 102 otherwise includes the track structure between which the wheels of the lawn mower are confined as described with respect to the first form of the invention.

It will therefore be observed that mechanism is provided for lowering the platform 102 from the position illustrated in FIGURE 9 wherein the starter mechanism 96 is out of engagement with the rotor blade 16 to a position illustrated in FIGURE 10 wherein the starter mechanism 96 is in engagement with the rotor blade 16 for rotation thereof upon energization of the motor 98 in a manner similar to that described with respect to the first form of the invention. The lowering mechanism may be of any suitable form in order to conveniently lower the platform 102 maintaining the opening 100 thereof above the starter mechanism 96 so that the blades of the lawn mower may be engaged thereby for starting the lawn mower engine 14. One exemplary type of lowering mechanism is illustrated and includes a plurality of roller members 110 pivotally connected at the lower end of a link member 112 which is pivotally connected at an upper end to pivot projection 114 which depend from below the platform 102 adjacent the corners thereof. A slidable frame member 116 interconnects all of the rollers 110 for simultaneous pivotal movement of all of the link members 112. The slidable frame member 116 is accordingly slidably guided over a pair of track members 118 mounted on the base member 106 for such purpose. A control rod 120 may therefore be pivotally connected at one end to the frame member 116 for slidable actuation thereof so as to cause pivotal movement of the link members 112 from the vertical position illustrated in FIGURE 9 to the angular position illustrated in FIGURE 10 causing lowering movement of the platform member 102. Operation of the foregoing starting apparatus will therefore be apparent. After movement of the lawn mower 10 up the ramp 104 onto the platform 102 above the opening 100 thereof, the platform may be simply lowered by means of the actuator member 120 for engagement of the mower blade with the motor 98 for rotation thereby and starting of the lawn mower motor 14.

Figure 12:
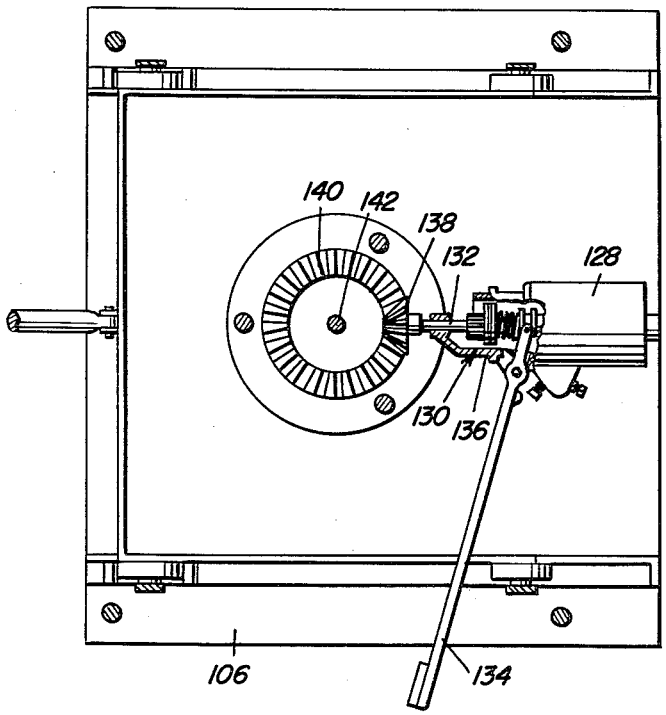
FIGURE 12 is a sectional view taken through a plane indicated by section line 12—12 in FIGURE 13, illustrating a third form of starting apparatus.
Figure 13:
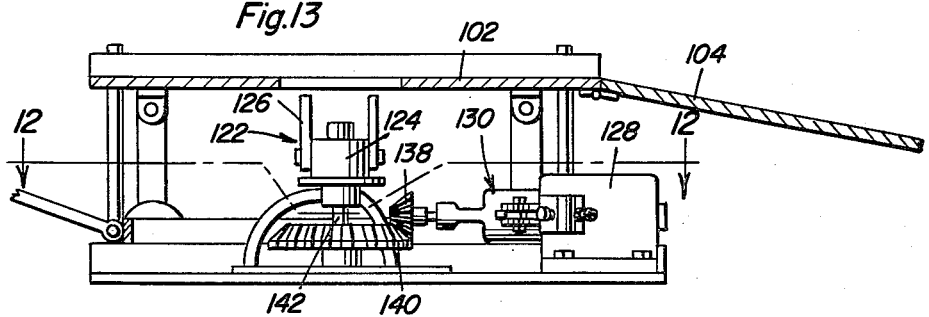
FIGURE 13 is a partial sectional view of the apparatus of FIGURE 12.
Figure 14:
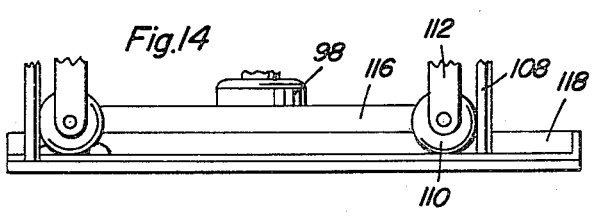
FIGURE 14 is a partial detail view of the platform lowering mechanism of FIGURES 9–11.

FIGURES 12 and 13 illustrate a third form of the invention. In this latter form of the invention, the platform and ramp arrangement as described with respect to FIGURES 9 through 11 is the same. However, the starter mechanism generally indicated by reference numeral 122 need not include the pivoted ratchet arms as described with respect to the starter mechanism 34 of the first form of the invention which is also applicable to the second form of the invention. Instead the rotary block member 124 of the starter mechanism 122 may have a pair of rigidly connected arms 126 bolted thereto for engagement of the lawn mower blade when the platform 102 is lowered thereover. It will however, be necessary to accommodate rotation of the lawn mower blade when it tends to overrun the starter mechanism 122. Accordingly, a starter motor 128 is provided and mounted on one side of the starter mechanism 122 which starter motor 128 features the disengageable clutch mechanism generally indicated by reference numeral 130. The clutch mechanism 130 is of a conventional design associated with automotive type starter motors whereby engagement of the clutch member 130 may be accomplished by a control for transmitting drive from the starter motor 128 to the output shaft 132. The control lever 134 is therefore provided and pivotally mounted to the casing 136 of the starter motor clutch mechanism, the outer end of the control lever 134 extending outwardly from below the platform 102 for easy actuation by the operator. Accordingly, upon actuation of the lever 134, the clutch mechanism 130 may be engaged to impart drive to the bevel gear 138 which bevel gear is geared to the bevel gear 140 connected by means of shaft 142 to the block member 124 of the starter mechanism 122. Accordingly, in order to start the lawn mower positioned on the platform 102 which has been lowered to a position wherein the starter mechanism 122 engages the blades thereof, it will only be necessary to actuate the lever 134 in order to drivingly connect the starter motor 128 with the starter mechanism 122 through the clutch mechanism 130. The lever 134 may be released to disengage the starter motor 128 from the drive connection to the starter mechanism 122 at any time desired. However, if the lawn mower engine has started up before release of the lever 134, the clutch mechanism will automatically disengage despite the engaged position of the lever 134, in a manner well known to those skilled in the art.

From the foregoing description, operation and utility of the applicants' invention will be apparent. As a result of the applicants' apparatus and method, a highly useful contribution has been made which will be especially appreciated by lawn mower repairmen and homeowners seeking rapid and effective engine starting.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Apparatus for starting an engine of a rotary lawn mower having mower blades comprising, a starter mechanism, positioning means for positioning a rotary lawn mower above the starter mechanism, said mechanism including driving means, and lift means for moving said starter mechanism toward said positioning means for engagement of the starter mechanism with the blades of the lawn mower for rotation thereof.

2. The apparatus as defined in claim 1, wherein said starter mechanism comprises one-way clutch means operative to transmit torque to the mower blades in one direction of rotation only and disengageable from the blades in response to the blades overrunning the driving clutch means.

3. The apparatus as defined in claim 2, wherein said lift means comprises base means, shaft means slidably mounted in said base means and connected to said starter mechanism, and lever means pivotally mounted on the base means and engageable with said shaft means for slidable displacement thereof in an upward direction with the starter mechanism.

4. The apparatus as defined in claim 3 wherein said shaft means includes socket means at an upper end thereof for receiving a mower blade mounting bolt head therein to center the lawn mower engine above the starter mechanism.

5. The apparatus as defined in claim 4, wherein said clutch means comprises a pair of ratchet arms pivotally connected to the shaft means and extending upwardly above the socket means on the upper end of the shaft means.

6. The apparatus as defined in claim 5, wherein said positioning means comprises a ramp connected to a raised platform having an opening therein through which said starter mechanism extends and adjustable tracks mounted on the platform for accommodating wheel spacings of different lawn mowers.

7. A device for starting the engine of a lawn mower having a movable cutting element drivingly connected with the output shaft of the engine whereby movement of the cutting element will cause rotation of the engine drive shaft for starting of the engine, said device comprising a starting mechanism including means engageable with the cutting element, power means operatively connected with the cutting element engaging means for causing movement of the cutting element when the cutting element engaging means and the cutting element are interengaged, said cutting element and cutting element engaging means constituting a pair of components, means for moving one of said components toward and away from the other component for selectively interengaging said components for imparting rotation to the output shaft of the engine, and means guiding said one component during the movement thereof toward and away from the other component, said guiding means including base means, platform means slidably mounted on said base means for lowering the lawn mower into engagement with said starter mechanism, and linkage means operatively connected to the base means and the platform means for selectively lower or raising the platform means relative to the starter mechanism.

8. The apparatus as defined in claim 7 wherein said power means includes a motor means anchored to the base means in axial fixed position in alignment with an opening in the platform means through which the starter mechanism extends into engagement with the mower blade upon lowering of the platform means.

9. The apparatus as defined in claim 7, wherein said starter mechanism includes socket means at an upper end thereof for receiving a mower blade mounting bolt head therein to center the lawn mower above the starter mechanism.

10. The apparatus as defined in claim 7, wherein said platform means comprises a ramp connected to a raised platform having an opening therein through which said starter mechanism extends and adjustable tracks mounted on the platform for accommodating wheel spacings of different lawn mowers.

11. The apparatus as defined in claim 10, wherein said power means includes motor means mounted below the platform means, gear means drivingly connected to the starter mechanism, clutch means operatively connecting the motor means to the gear means and clutch actuator means projecting from below the platform means and operatively connected to said clutch means for selective engagement and release of the clutch means, said clutch means being automatically disengageable in response to starting of the mower engine.

12. The apparatus as defined in claim 7, wherein said power means includes motor means mounted below the platform means, gear means drivingly connected to the starter mechanism, clutch means operatively connecting the motor means to the gear means and clutch actuator means projecting from below the platform means and operatively connected to said clutch means for selective engagement and release of the clutch means, said clutch means being automatically disengageable in response to starting of the mower engine.

13. A device for starting the engine of a lawn mower having a movable cutting element drivingly connected with the output shaft of the engine whereby movement of the cutting element will cause rotation of the engine drive shaft for starting of the engine, said device comprising a starting mechanism including means engageable with the cutting element, power means operatively connected with the cutting element engaging means for causing movement of the cutting element, means for moving the cutting element engaging means and the cutting element relative to each other, and means guiding the cutting element and cutting element engaging means during relative movement thereof whereby the cutting element engaging means will engage with the cutting element during such relative movement for imparting rotational movement to the output shaft of the engine to thereby start the mower engine.

14. The structure as defined in claim 13 wherein said cutting element engaging means includes a one-way clutch means for disconnecting the cutting element engaging means from the cutting element when the cutting element is driven from the engine rather than from the power means.

15. The structure as defined in claim 13 wherein said guiding means includes a support for the mower, said support including means for positioning the mower and the cutting element thereof in predetermined relation to the cutting element engaging means and means interconnecting the support and the cutting element engaging means for relative movement thereof thus selectively engaging the cutting element engaging means with the cutting element.

16. A device for starting the engine of a lawn mower having a movable cutting element drivingly connected with the output shaft of the engine whereby movement of the cutting element will cause rotation of the engine drive shaft for starting of the engine, said device comprising a starting mechanism including means engageable with the cutting element, power means operatively connected with the cutting element engaging means for causing movement of the cutting element when the cutting element engaging means and the cutting element are interengaged, said cutting element and cutting element engaging means constituting a pair of components, means for moving one of said components toward and away from the other component for selectively interengaging said component for imparting rotation to the output shaft of the engine, and means guiding said one components during the movement thereof toward and away from the other component.

References Cited in the file of this patent
UNITED STATES PATENTS

| | | |
|---|---|---|
| 2,097,729 | Mall | Nov. 2, 1937 |
| 2,309,347 | Landgraf | Jan. 26, 1943 |
| 2,663,984 | Clark | Dec. 29, 1953 |
| 2,865,358 | Musgrave | Dec. 23, 1958 |
| 2,901,911 | Duncan | Sept. 1, 1959 |
| 2,930,068 | Evanson et al. | Mar. 29, 1960 |
| 2,968,923 | Coleman | Jan. 24, 1961 |
| 2,996,927 | Rome | Aug. 22, 1961 |